United States Patent [19]

Savel, III

[11] Patent Number: 4,751,777

[45] Date of Patent: Jun. 21, 1988

[54] METHOD FOR MAKING A FULL ROUND BUSHING

[75] Inventor: Frank J. Savel, III, Cleveland, Ohio

[73] Assignee: JPI Aquisition, Inc., Ann Arbor, Mich.

[21] Appl. No.: 902,538

[22] Filed: Sep. 2, 1986

[51] Int. Cl.$^4$ .............................................. B21D 53/10
[52] U.S. Cl. ......................... 29/149.5 R; 219/121 LD
[58] Field of Search .................. 29/149.56, 149.5 DP, 29/149.5 R, 149.55, 149.5 NM; 219/121 L, 121 LD

[56] References Cited

U.S. PATENT DOCUMENTS 4,031,734  6/1977  Imme et al. ..................... 29/149.5 C
4,626,653  12/1986  Sciakey et al. ................ 219/121 LC

FOREIGN PATENT DOCUMENTS 3407417  9/1985  Fed. Rep. of Germany ...... 219/121 LD
76690  5/1984  Japan ........................... 219/121 LD
593757  11/1975  Switzerland ................... 219/121 LD Primary Examiner—Timothy V. Eley
Attorney, Agent, or Firm—Harness, Dickey & Pierce

[57] ABSTRACT

A full round bushing is formed by laser welding opposed edges of a bimetal member deformed into a generally cylindrical configuration. The laser beam parameters are closely controlled so as to limit any adverse effect on a bearing metal layer. The weld only reaches a depth approximating 20% to 75% of a steel reinforcing layer. The beam approaches the seam at an angle of incidence approximating 10° to 45° and at a laser focal point offset 5% tp 70% of the spot diameter of the laser beam. An overlap of the pulse spot-welding approximating 50% to 75% is preferable.

24 Claims, 2 Drawing Sheets

METHOD FOR MAKING A FULL ROUND BUSHING

BACKGROUND OF THE INVENTION

This invention pertains to the art of bushings and more particularly to clinch free cam bushings. The invention is particularly applicable to a method of making full round bushings and will be described with particular reference thereto. However, it will be appreciated that the invention has broader applications and may be advantageously employed in other fastening and joining environments and applications requiring close tolerances.

Typically, full round bushings have been produced by one of the following standard methods. According to a first method, a strip of bimetal material is formed into a round, generally cylindrical shape in which opposed edges of the material are joined or interlocked by clinching. The clinched edges resemble the interlocking pattern of a dovetail or cooperating puzzle pieces. Generally, a wide range of bearing metal alloys can be used with an outer steel layer which also makes clinched design bushings attractive from a manufacturing standpoint. Clinched design bushings have met with commercial success when used in high volume since manufacturers have automated machinery for supporting a workpiece during various machining steps. Such a design requires extensive fixturing and precise assembly control. In those applications where fixturing is not readily available, the detailed assembly can pose difficult problems. These manufacturing requirements do not make it economical or practical for low or moderate volume bushing production runs.

Other drawbacks are associated with the clinched design. For example, the clinched seam can become loose or distorted during installation which, in turn, causes the bushing to be out-of-round and unusable for its intended purpose.

A second standard method of producing full round bushings is an enhancement of the first. In this method the strip formed bushing seam is welded using electron beam, T.I.G., M.I.G., submerged arc, or other standard welding processes. The disadvantages of these processes are cost and resultant quality. The electron beam process must be performed in a full or partial vacuum and is therefore slow and costly. The other processes mentioned are of high heat intensity and can damage the structure of low melting point bearing materials and the bonding of these materials to the steel backing.

A third standard method involves the drawing of a full round product from pre-cast, sintered, or clad bimetallic strip. This method is limited by the types of materials that can be drawn, is slow, and inefficient in the use of material and is, therefore, costly.

A final standard method of producing full round bushings involves use of solid tubing having a bearing material cast along the inside diameter thereof. Bushings are then cut to a desired length from the solid tube and, in this manner, there is no visible joint in the steel or bearing material.

Although these bushings do not have the problems associated with the clinch or other designs produced from strip, other problems are associated with this method of manufacture. For example, these bushings are relatively expensive to produce and limited to an inner diameter bearing material that is compatible with centrifugal casting.

It has thus been deemed desirable to produce a full round bushing that may accommodate a large selection of materials for the bearing alloys and yet is relatively inexpensive to manufacture. Further, the distortion and loosening problems associated with the clinch design are preferably to be avoided.

SUMMARY OF THE INVENTION

According to the subject invention, an economical method of forming a full round bushing that is adaptable to a wide selection of bearing materials and of reliable quality is provided.

According to a more limited aspect of the invention, the method of making a full round bushing includes the steps of supplying a generally cylindrical member having opposed edges disposed in spaced, generally facing relation along a longitudinal length thereof. The cylindrical member has first and second different metal layers, in which one of the layers defines a bearing surface. Laser welding of opposed edges forms an integral structure.

According to another aspect of the invention, the laser welding is limited to the non-bearing metal layer so that the bearing metal is not degraded.

According to a still more limited aspect of the invention, the extent of welding is limited to a predetermined depth of the non-bearing metal layer. A depth of approximately 20% to 75% of the radial thickness of the non-bearing metal layer is preferred and a depth of 50% of the radial thickness is considered ideal.

According to yet another aspect of the invention, the welding steps include disposing a laser beam at an angle to a radial plane defined between the opposed edges of the material. An angular range approximating 10° to 45° is preferable, and ideally, an angle approximating 20° to 25° to a radial plane is defined between these edges.

According to a still further aspect of the invention, the welding step defines a focal point offset from one edge a dimension approximating 5% to 70% of a spot diameter of the laser beam. Ideally, the focal point offset approximates 10% to 30% of the spot diameter.

According to another aspect of the invention, the welding is specifically a spot-welding process in which individual spots are overlapped. Ideally, these spots are overlapped approximately 50% to 70%.

A primary advantage of the subject invention is the economical manufacture of a full round bushing.

Yet another advantage of the invention is realized in the wide range of materials that can be used for the bearing surface.

Still another advantage of the subject invention is found in the reliable joint formed between opposed edges of the bushing.

Still other advantages and benefits of the invention will become apparent to those skilled in the art upon a reading and understanding of the following detailed description.

BRIEF DESCRIPTION OF THE DRAWINGS

The subject invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figures 1A, 1B:
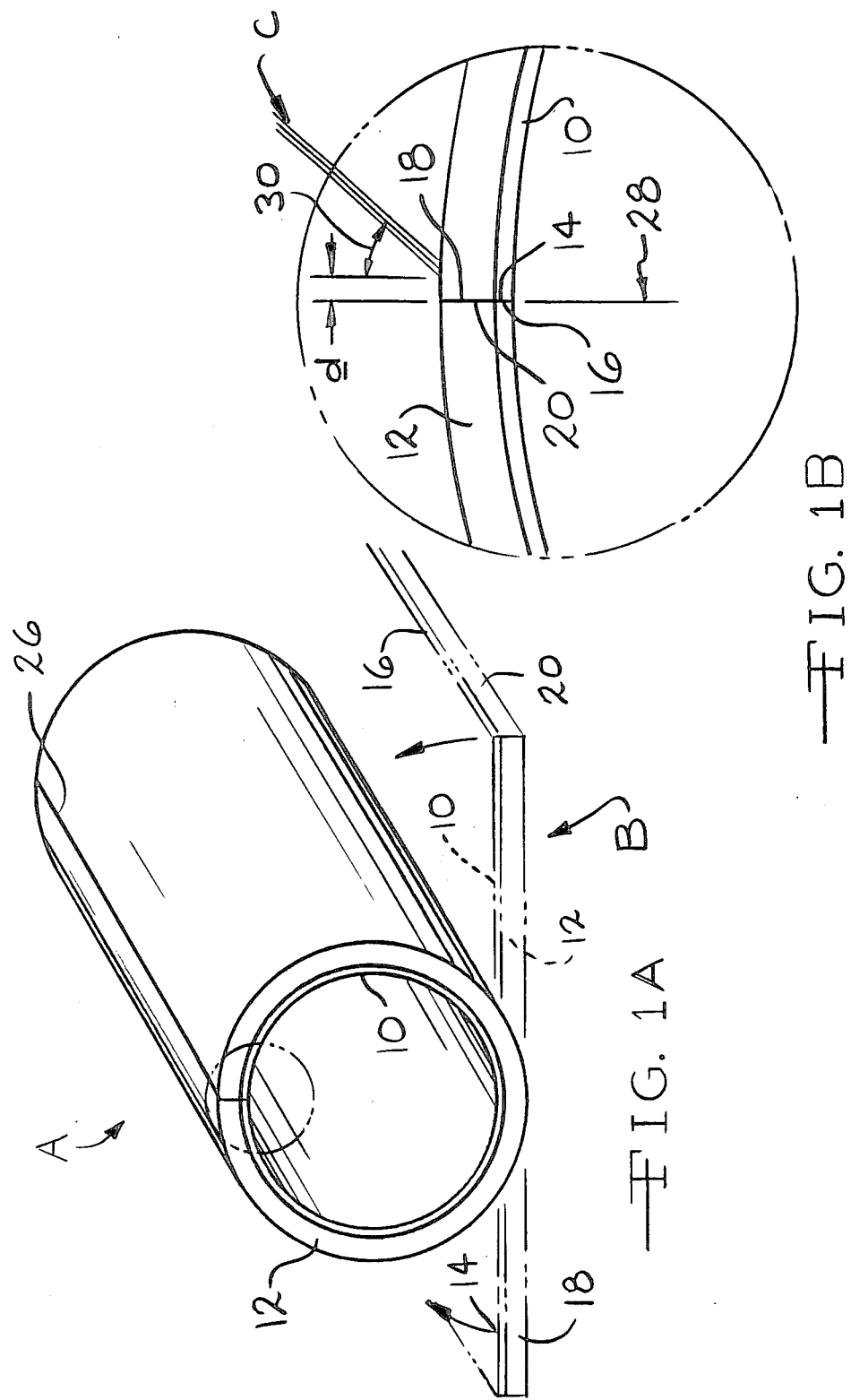
FIG. 1A is a perspective view of a bushing having a laser welded joint formed in accordance with the teachings of the subject invention.
FIG. 1B is an enlarged, detailed end view of the encircled portion of FIG. 1A.
Figure 2:
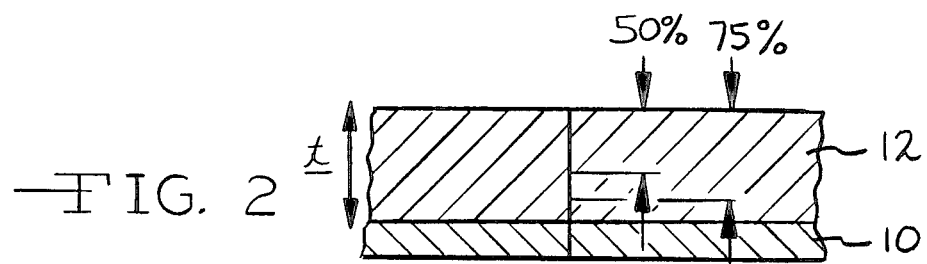
FIG. 2 is a detailed end view schematically illustrating the depth of penetration of the laser weld.

Referring now to the drawings wherein the showings are for purposes of illustrating the preferred embodiment of the invention only and not for purposes of limiting same, the FIGURES show a full round bushing A formed from a generally planar bimetal member B. The bimetal member is deformed into a generally hollow cylindrical configuration through conventional methods. A laser beam C typically of $CO_2$ or YAG type is designed to weld closely-spaced, opposed edges of the bimetal member and interlock these opposed edges to form a full round bushing.

More specifically, and with reference to FIGS. 1A and 1B, the bimetal member B includes a first layer 10 comprising a bearing metal of preselected alloy composition such as tin/lead based babbits, aluminum bearing alloys, copper-lead-tin alloys, etc. This layer is designed to provide a lubricated surface designed for sliding fit with a journal or other machine element as is known in the art. A second layer 12 defines a reinforcing metal, commonly of steel composition. According to known methods of manufacture, the first and second layers are secured together to form an integral structure. The bimetal member is deformed into a generally hollow cylindrical configuration in which the bearing metal is disposed along an inner peripheral portion. The reinforcing metal layer is thereby disposed along the outer periphery. Opposed edges 14, 16 of the bearing metal, as well as opposed edges 18, 20 of the reinforcing metal layer, are positioned in facing relation before welding. The opposed edge pairs are closely spaced along a longitudinal length 26 of the bushing.

As indicated above, the opposed edges may have been clinched together in prior art constructions. According to the subject invention, the opposed edges of the non-bearing metal or steel layer are laser welded. In this manner, a reliable joint is achieved without adverse effect on the bearing metal layer.

FIG. 1B illustrates the critical parameters utilized in laser welding the bushing. It is necessary to position the laser beam relative to the opposed edges in a manner that will have no adverse effect on the bearing metal layer. A radial plane 28 is generally defined between the opposed edge pairs. The laser beam angle of incidence 30 is defined relative to this radial plane. Further, a focal point of the laser beam C is offset from the radial plane a distance d.

With continued reference to FIG. 1B, and additional reference to FIGS. 2-6, the critical parameters employed in the welding process will be described with greater particularity. The laser welding is essentially limited to the reinforcing or steel layer 12 of the cylindrical configuration. The heat developed during welding can easily degrade various bearing alloys due to their low melting point. Since the steel layer requires the intense heat developed by a concentrated laser beam in order to fuse the opposed edges 18, 20 together, it is vital that the laser beam be isolated from the bearing metal.

In the preferred embodiment, the steel reinforcing layer 12 is disposed along the outer peripheral portion. The precise depth of the weld is carefully controlled through regulation of the intensity of the laser beam as well as the welding speed along the generally longitudinal length 26 of the bushing. That is, the power required for fusion with a laser beam is a function of thickness of the steel and speed of welding. Preferably, the depth of the weld ranges between approximately 20% to 75% of the radial thickness t of the steel layer 12. Ideally, the laser welding takes place to a depth of approximately 50% of the steel layer thickness. In this manner, the bearing metal layer remains unaffected by this process. The high energy intensity of the laser beam heats only the limited area of steel to the welding temperature and the thermal mass of the bushing itself dissipates the heat quickly so as not to affect the bearing metal layer.

Figure 3:
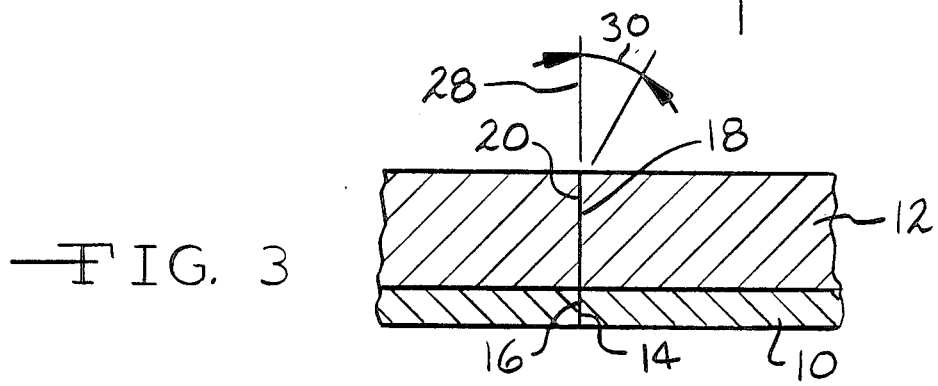
FIG. 3 is a detailed end view schematically illustrating the angular disposition of the laser beam relative to the joint.
Figure 4:
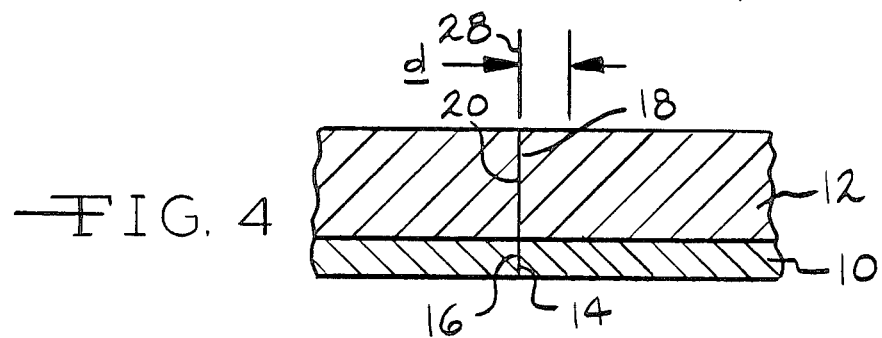
FIG. 4 is a detailed end view schematically showing the focal point offset of the laser beam from the joint.

FIG. 1B and FIG. 3 demonstrate the angle of incidence of the laser beam C relative to the radial plane 28. Preferably, the angle of incidence ranges from approximately 10° to 45° and ideally is defined at about 20° to 25° to this radial plane. The angle of incidence assures that the laser light path never crosses the bearing layer 10 since the angle of incidence is defined by the laser beam arriving at the surface of the steel layer and the angle formed with a perpendicular to that surface at the point of arrival.

As further protection for the bearing layer, and as one means for venting the majority of the vaporizing alloy during welding, the steel or reinforcing layer is welded from one side of the joint. The laser focal point is offset a distance d from the radial plane 28 and measured between the radial plane and the perpendicular defining the angle of incidence. The offset dimension is defined as a function of the laser beam diameter x and preferably ranges between 5% and 70% of this diameter. Best results have been achieved, though, with an offset distance ranging between 10% and 30% of the laser beam diameter.

Figure 5:
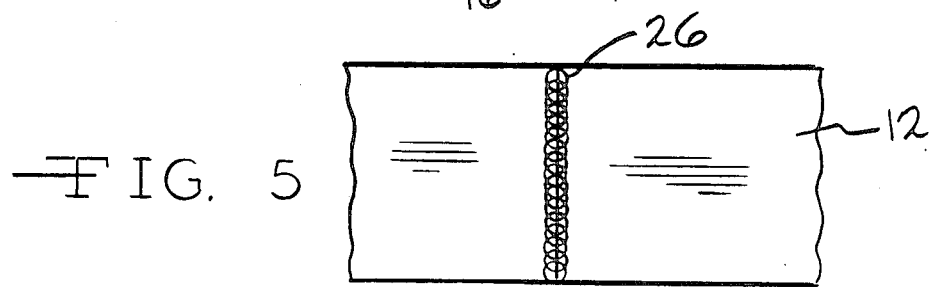
FIG. 5 is a plan view of the laser welded seam formed in accordance with the teachings of the subject invention.
Figure 6:
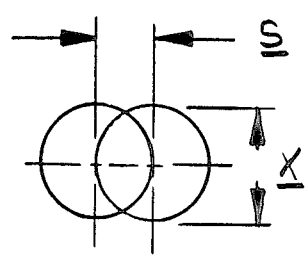
FIG. 6 is an enlarged, detailed diagrammatical view of the overlap between successive, individual weld spots in accordance with the subject invention; and, FIG. 7 generally illustrates a tempering step of the laser weld.

With particular reference to FIGS. 5 and 6, yet another advantageous feature of the subject invention is exhibited. Although laser welding may be accomplished through use of a continuous laser beam, it has been realized that spot welding is preferable. Pulsing the laser beam eliminates small blow holes in the weld bead. Pulsing the beam eliminates these small blow holes by overlapping the pulses by approximately 50% to 70%. The dimension s represents the amount of overlap, once again, based on the diameter of the laser beam. In effect, overlapping the pulses repairs any small blow holes that may be formed. Further, as indicated above, the depth or penetration of the weld through the steel layer can be closely controlled.

Use of a laser beam for welding has many advantages. No special joint configuration is required, especially when the above-noted parameters are utilized. As long as the laser beam is isolated from the bearing layer, improved results are achieved. Additionally, no filler material is utilized and welding may be accomplished on unclean parts. Typically, when two pieces are welded together, it is necessary that the contiguous surfaces be cleaned. The beam angle of incidence, the beam temperature and intensity, as well as the controlled beam travel rate permit welding to be accomplished on unclean parts. Welding speeds ranging from 100 inches per minute to 1000 inches per minute are obtainable by the above-noted process. Thus, a reliable, integral structure is formed in an economical manner.

Figure 7:
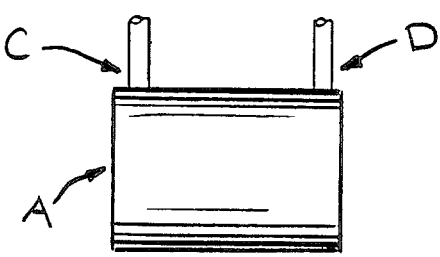

Post-process tempering may also directly follow the welding operation. With reference to FIG. 7, the laser beam weld C is illustrated as the initial welding process on the bushing. A second or tempering laser beam D may be utilized downline from the initial weld beam. The post-process tempering is accomplished either with a second, low power laser pass or by splitting the laser beam C and utilizing a segment to weld and a lesser segment D to temper. Although the tempering is desirable, it is not required.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

Having thus described the invention it is now claimed:

1. A method of making a full round bushing comprising the steps of:
   supplying a hollow generally cylindrial member having an open longitudinal seam defined by opposed edges disposed in generally facing relation, said cylindrical member having at least first and second different metal layers in generally concentric relation, one of said layers defining a bearing surface; and,
   laser welding said opposed edges to form an integral structure wherein said laser welding is essentially limited to the other of said metal layers such that said bearing surface is not degraded by said welding step.

2. The method as defined in claim 1 wherein said laser welding step includes welding to a depth of approximately 20% to 75% of the radial thickness of said other of said metal layers.

3. The method as defined in claim 1 wherein said laser welding step includes welding to a depth of approximately 50% of the radial thickness of said other of said metal layers.

4. The method as defined in claim 1 wherein said laser welding step includes welding with a beam oriented at an angle approximating 10 degrees to 45 degrees to a radial plane defined between said opposed edges.

5. The method as defined in claim 1 wherein said laser welding step includes welding with a beam oriented at an angle approximating 20 degrees to 25 degrees to a radial plane defined between said opposed edges.

6. The method as defined in claim 1 wherein said laser welding step includes welding with a beam with its focal point offset from one of said edges a dimension approximating 5% to 70% of a spot diameter of the laser beam.

7. The method as defined in claim 1 wherein said laser welding step includes welding with a beam with its focal point offset from one of said edges a dimension approximating 10% to 30% of a diameter of the laser beam.

8. The method as defined in claim 1 wherein said laser welding step includes forming spot welds which are overlapped approximately 50% to 70% of the spot diameter of the laser beam.

9. A method of making a full round bushing comprising the steps of:
   supplying a multiple layered member having a first layer defining a bearing surface and a second reinforcing layer;
   forming said member into a generally cylindrical configuration in which said first layer is disposed along an inner peripheral portion thereof and opposed edges are disposed in close-spaced relation along a longitudinal length thereof; and,
   laser welding said opposed edges of said second layer to form an integral structure wherein said laser welding is essentially limited to said second layer wherein said bearing surface is not degraded by said welding step.

10. The method as defined in claim 11 wherein said laser welding step includes welding to a depth of approximately 20% to 75% of the radial thickness of said second layer.

11. The method as defined in claim 9 wherein said laser welding step includes welding to a depth of approximately 50% of the radial thickness of said second layer.

12. The method as defined in claim 9 wherein said laser welding step includes welding with a laser beam disposed at an angle to a radial plane defined between said opposed edges.

13. The method as defined in claim 9 wherein said laser welding step includes welding at an angle approximating 10° to 45° to a radial plane defined between said opposed edges.

14. The method as defined in claim 9 further including the step of post-weld tempering by laser.

15. A bushing made in accordance with the method of claim 11.

16. The method as defined in claim 9 wherein said laser welding step includes welding with a beam oriented at an angle approximating 20 degrees to 25 degrees to said radial plane defined between said opposed edges.

17. The method as defined in claim 9 wherein said laser welding step includes welding with a beam with its focal point offset from one edge of said member a dimension approximating 5% to 70% of a spot diameter of the laser beam.

18. The method as defined in claim 9 wherein said laser welding step includes welding with a beam with its focal point offset from one edge a dimension approximating 10% to 30% of a spot diameter of the laser beam.

19. The method as defined in claim 9 wherein said laser welding step includes forming individual spot welds which are overlapped approximately 50% to 70% of the spot diameter of the laser beam.

20. A method of making full round bushings comprising the steps of:

supplying a multiple layered member having a first layer defining a bearing surface and a second layer defining a reinforcing metal;

forming said member into a generally cylindrical configuration in which said first layer is disposed along the inside surface of said member and opposed edges defining a seam are disposed in close spaced relation along a longitudinal length thereof; and, laser welding said opposing edges of said second layer to form an integral structure using a laser beam which welds to a depth of approximately 20% to 75% of the radial thickness of said second layer, whereby said bearing surface is not degraded by said welding step, said laser beam oriented at an angle approximately 10 degrees to 45 degrees to the radial plane defined between said opposing edges and wherein the focal point of said laser beam is offset from one of said edges a dimension approximately 5% to 70% of the spot diameter of said laser beam.

21. The method as defined in claim 20 wherein said laser welding step includes welding to a depth of approximately 50% of the radial thickness of said other of said second layer.

22. The method as defined in claim 20 wherein said laser welding step includes welding with a beam oriented at an angle approximating 20 degrees to 25 degrees to said radial plane.

23. The method as defined in claim 20 wherein said laser welding step includes welding with a beam with its focal point offset from one of said edges a dimension approximating 10% to 30% of a spot diameter of the laser beam.

24. The method as defined in claim 20 wherein said laser welding step includes forming individual spot welds which are overlapped approximately 50% to 70% of the spot diameter of said laser beam.

* * * * *

UNITED STATES PATENT AND TRADEMARK OFFICE
CERTIFICATE OF CORRECTION

PATENT NO. : 4,751,777

DATED : June 21, 1988

INVENTOR(S) : Frank J. Savel, III

It is certified that error appears in the above-identified patent and that said Letters Patent is hereby corrected as shown below:

Column 6, Line 9, (Claim 8, Line 2) after "forming" insert --individual--

Column 6, Line 28, (Claim 10, Line 1) after "claim" delete --11-- and insert --9--

Signed and Sealed this

Sixth Day of December, 1988

Attest:

DONALD J. QUIGG

*Attesting Officer*  *Commissioner of Patents and Trademarks*